Sept. 22, 1925.

D. C. WRIGHT

SYSTEM FOR CONTROLLING ELECTRIC MOTORS

Filed March 13, 1925

1,554,318

INVENTOR
D. C. Wright
by F. N. Barber
attorney

Patented Sept. 22, 1925.

1,554,318

UNITED STATES PATENT OFFICE.

DAVID C. WRIGHT, OF EUCLID, OHIO, ASSIGNOR TO THE ELECTRIC CONTROLLER & MANUFACTURING COMPANY, OF CLEVELAND, OHIO, A CORPORATION OF OHIO.

SYSTEM FOR CONTROLLING ELECTRIC MOTORS.

Application filed March 13, 1925. Serial No. 15,184.

*To all whom it may concern:*

Be it known that I, DAVID C. WRIGHT, a citizen of the United States, residing at Euclid, in the county of Cuyahoga and State of Ohio, have invented new and useful Improvements in Systems for Controlling Electric Motors, of which the following is a specification.

My invention relates to systems for controlling electric motors from a point which may be distant from the motors.

One object of this invention is to provide a control system in which only a single control wire is required between the master switch and the magnetically-operated switches which control the motor, and this without the employment of a relay in the circuit of the single wire. Such a relay is shown in Patent No. 902,396 granted October 27, 1908 on an application of J. H. Hall. Other objects appear hereinafter.

Figure 1:
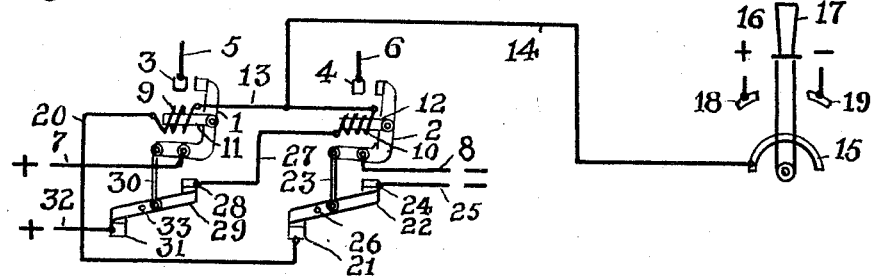
Figure 2:
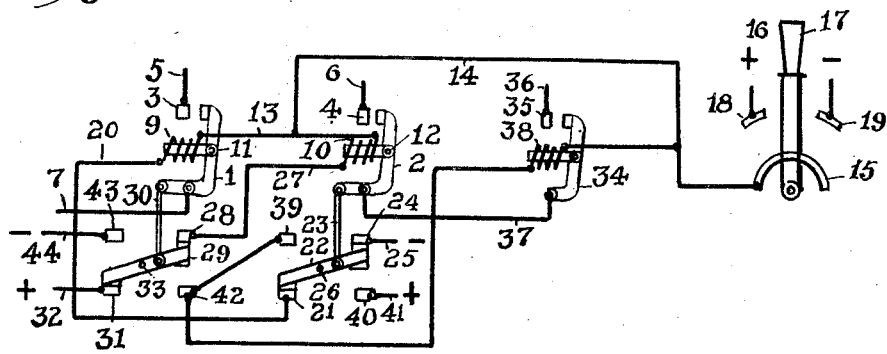
Figure 3:
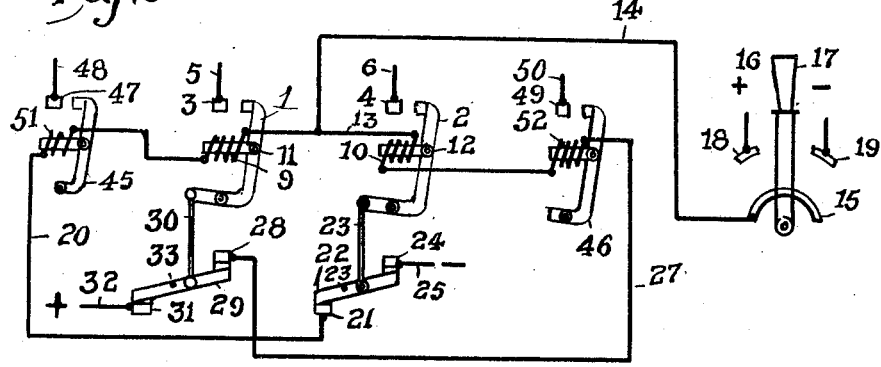

Referring to the accompanying drawing, Fig. 1 is a diagrammatic view of that portion of a motor system which relates to a pair of motor reversing switches and a master switch for the same; Fig. 2 is a similar diagrammatic view which embodies a circuit breaker contactor, and Fig. 3 is a diagrammatic view showing two pairs of motor reversing switches and a master switch therefor.

Referring first to Fig. 1, 1 and 2 designate two contactors of a pair of reversing switches for an electric motor. The contactors are adapted when closed to engage the fixed contacts 3 and 4 to which the wires 5 and 6 are connected. These wires lead to the armature circuit of a motor in a manner well understood. I have not shown the motor armature and field windings or the accelerating resistance or any part of the motor circuit except the parts already described, namely the contactors 1 and 2, the contacts 3 and 4 and the wires 5 and 6 together with the wires 7 and 8 which are connected to the contactors 1 and 2 and lead to the positive and negative sources of current. My invention does not relate to the omitted parts but merely to the features shown.

The contactors are actuated to closing positions by the windings 9 and 10 wound around the core-armatures 11 and 12 attached to the contactors 1 and 2. One end of the winding 9 and one end of the winding 10 are connected together by the wire 13 which is connected by the wire 14 to the fixed contact 15 of the master switch 16 having the switch-arm 17 always in engagement with the contact 15 and adapted in one position to engage the positive contact 18 and in another position the negative contact 19. The arm 17 has an "off" position between the contacts 18 and 19, where it touches neither contact.

The remaining end of the windings 9 is connected by the wire 20 to the fixed contact 21 of the auxiliary switch 22 which is operated by the link 23 connected to the contactor 2. The switch 22 when closed connects the contact 21 to the fixed contact 24 to which the negative wire 25 is attached. The contactor 2 is closing opens the switch 22, and in opening closes the switch 22, which swings on the pivot 26.

The remaining end of the winding 10 is connected by the wire 27 to the fixed contact 28 of the auxiliary switch 29 which is operated by the link 30 connected to the contactor 1. The switch 29 when closed connects the contact 28 to the contact 31 to which the positive wire 32 is attached. The contactor 1 in closing opens the switch 29, and in opening closes the switch 29 which swings on the pivot 33.

If the master switch arm 17 is moved upon the contact 18, current flows from the contact 18 through the arm 17, the contact 15, the wire 14, the wire 13, the winding 9, the wire 20, the contact 21, the auxiliary switch 22, and the contact 24 to the negative wire 25. The windings 9 and 10, which are connected across the positive and negative sources of current, are easily so designed that they will not close the contactors 1 and 2 when the master switch is in off position. The current in the circuit just traced energizes the winding 9 and causes the contactor 1 to close, which in closing opens the switch 29, thereby disconnecting the winding 10 from the positive line 32 and preventing the accidental energization of the winding 10 and the consequent closing of the contactor 2. The switch 29 has a further function to be mentioned hereinafter.

When the master switch is moved to off position, the winding 9 is deprived of current and the contactor 1 accordingly drops open and the switch 29 is restored to the circuit of the winding 10.

If the master switch-arm 17 is moved upon the negative contact 19, current will flow from the positive wire 32 through the contact 31, the auxiliary switch 29, the contact 28, the wire 27, the winding 10, the wires 13 and 14, the contact 15, the arm 17 and the contact 19 to the negative source of current supply. The current in this circuit energizes the winding 10 which causes the contactor 2 to be closed, the latter causing the switch 22 to open the circuit of the winding 9. When the arm is moved to off position the contactor drops open and the switch 22 closes the circuit of the winding 9.

It is seen that the switches 22 and 29 open the connection of the windings 9 and 10 across the wire 25 and 32, so that, when the switch-arm 17 is moved to off position, the winding which was holding its contactor closed is completely deenergized, thus preventing the requirement of a relay to deenergize the circuit of the windings 9 and 10.

In Fig. 2, the parts are as in Fig. 1 except as to those required by the inclusion of the circuit breaking contactor 34 which is adapted to engage the fixed contact 35 to which the wire 36 in series with the motor circuit is connected. The contactor 2 is connected by the wire 37 to the contactor 34. The latter is actuated by the winding 38 which has one end connected to the wire 14 and the other end to the contact 39 with which the switch 22 engages when the contactor 2 closes, at which time the switch connects the contact 39 to the contact 40 which is connected by the wire 41 to the positive source of power. The last named end of the winding 38 is connected also to the contact 42 with which the switch 29 engages when the contactor 1 is closed, at which time the switch 29 connects the contact 42 to the contact 43 which is connected by the wire 44 to the negative source of current.

When the contactor 2 closes, it closes the circuit of the winding 38 and causes the contactor 34 to close, thereby closing that part of the motor or main circuit indicated by the wire 6, the contact 4, the contactor 2, the wire 37, the contactor 34, the contact 35 and the wire 36. When the contactor 2 falls open as herein described it operates the switch 22 to open the circuit of the contactor 34 which at once opens the main circuit just traced.

In Fig. 3, I have shown two pairs of reversing switches for a motor, the manner of connecting such switches to a motor circuit being old. Two contactors 45 and 46 have been added to what is shown in Fig. 1. The contactor 45 closes on the contact 47 to which the wire 48 is connected, and the contactor 46 closes on the contact 49 to which the wire 50 is attached. The wires 5 and 6 are connected to one side of a motor circuit and the wires 48 and 50 are connected to the other side thereof to form the well known motor reversing system. The wire 20 includes the actuating winding 51 of the contactor 45 and the wire 27 includes the windings 52 of the contactor 46. Otherwise the system of Figs. 1 and 3 are alike. In Fig. 3 the contactors 1 and 45 close simultaneously, and the contactors 2 and 46 also close simultaneously.

I claim—

1. The combination with a master controller having a contact connected to the positive side of a circuit and a contact connected to the negative side of the circuit, of two electromagnetic contactors having their windings connected in series to a source of current when the master controller is in off position, and a single wire leading directly to the master controller from a point in the conductor connecting the said windings.

2. The combination with a master controller having a contact connected to the positive side of a circuit and a contact connected to the negative side of the circuit, of two electromagnetic contactors having their windings connected in series to a source of current when the master controller is in off position, a single wire leading directly to the master controller from a point in the conductor connecting the said windings, and means for making the operating winding of one contactor ineffective when the circuit of the winding of the other contactor is closed through the master controller.

3. The combination with a master controller having a contact connected to the positive side of a circuit and a contact connected to the negative side of the circuit, of two electromagnetic contactors having their windings connected in series to a source of current when the master controller is in off position, a single wire leading to the master controller from a point in the conductor connecting the said windings, a third electromagnetic contactor, and means for energizing the operating winding of the third contactor whenever either of the first two windings is energized.

4. The combination with a master controller having a contact connected to the positive side of a circuit and a contact connected to the negative side thereof, of two pairs of electromagnetic contactors having their operating winding connected in series to a source of current when the master controller is in off position, and a single wire leading to the master controller from a point in the conductor connecting two of the said windings.

In testimony whereof, I hereunto affix my signature this 11th day of March, 1925.

DAVID C. WRIGHT.